United States Patent
Karuppaiah et al.

(10) Patent No.: US 6,756,150 B2
(45) Date of Patent: Jun. 29, 2004

(54) FUEL CELL HAVING A NON-ELECTROLYTIC LAYER

(75) Inventors: Chockkalingham Karuppaiah, Troy, NY (US); Yaobang Wu, Latham, NY (US)

(73) Assignee: Plug Power Inc., Latham, NY (US)

( * ) Notice: Subject to any disclaimer, the term of this patent is extended or adjusted under 35 U.S.C. 154(b) by 68 days.

(21) Appl. No.: 10/118,389

(22) Filed: Apr. 8, 2002

(65) Prior Publication Data

US 2003/0190518 A1 Oct. 9, 2003

(51) Int. Cl.[7] .............................................. H01M 4/96
(52) U.S. Cl. ............................ 429/44; 429/40; 429/42
(58) Field of Search ............................ 429/40, 42, 44

(56) References Cited

U.S. PATENT DOCUMENTS

| | | | |
|---|---|---|---|
| 5,470,671 A | | 11/1995 | Fletcher et al. |
| 5,486,430 A | | 1/1996 | Gorbell et al. |
| 5,500,292 A | * | 3/1996 | Muranaka et al. .......... 429/209 |
| 5,976,726 A | | 11/1999 | Wilkinson et al. |
| 6,066,409 A | | 5/2000 | Ronne et al. |
| 6,080,503 A | | 6/2000 | Schmid et al. |
| 6,232,006 B1 | | 5/2001 | Breault |
| 6,287,717 B1 | * | 9/2001 | Cavalca et al. ............... 429/40 |
| 6,350,538 B1 | | 2/2002 | Wilkinson et al. |
| 6,365,293 B1 | * | 4/2002 | Isono et al. .................. 429/30 |
| 6,403,247 B1 | | 6/2002 | Guthrie et al. |
| 6,475,651 B1 | | 11/2002 | Wilkinson et al. |

* cited by examiner

*Primary Examiner*—Dah-Wei Yuan
(74) *Attorney, Agent, or Firm*—Fish & Richardson P.C.

(57) ABSTRACT

A non-electrolytic layer that can be used, for example, in an electrode unit, a fuel cell, and/or a fuel cell stack is disclosed.

22 Claims, 7 Drawing Sheets

FUEL CELL HAVING A NON-ELECTROLYTIC LAYER

FIELD OF THE INVENTION

The invention relates to fuel cells.

BACKGROUND

A fuel cell can convert chemical energy to electrical energy by promoting a chemical reaction between two gases.

One type of fuel cell includes a cathode flow field plate, an anode flow field plate, a membrane electrode assembly disposed between the cathode flow field plate and the anode flow field plate, and two gas diffusion layers disposed between the cathode flow field plate and the anode flow field plate. A fuel cell can also include one or more coolant flow field plates disposed adjacent the exterior of the anode flow field plate and/or the exterior of the cathode flow field plate.

Each flow field plate has an inlet region, an outlet region and open-faced channels connecting the inlet region to the outlet region and providing a way for distributing the gases to the membrane electrode assembly.

The membrane electrode assembly usually includes a solid electrolyte (e.g., a proton exchange membrane, commonly abbreviated as a PEM) between a first catalyst and a second catalyst. One gas diffusion layer is between the first catalyst and the anode flow field plate, and the other gas diffusion layer is between the second catalyst and the cathode flow field plate.

During operation of the fuel cell, one of the gases (the anode gas) enters the anode flow field plate at the inlet region of the anode flow field plate and flows through the channels of the anode flow field plate toward the outlet region of the anode flow field plate. The other gas (the cathode gas) enters the cathode flow field plate at the inlet region of the cathode flow field plate and flows through the channels of the cathode flow field plate toward the cathode flow field plate outlet region.

As the anode gas flows through the channels of the anode flow field plate, the anode gas passes through the anode gas diffusion layer and interacts with the anode catalyst. Similarly, as the cathode gas flows through the channels of the cathode flow field plate, the cathode gas passes through the cathode gas diffusion layer and interacts with the cathode catalyst.

The anode catalyst interacts with the anode gas to catalyze the conversion of the anode gas to reaction intermediates. The reaction intermediates include ions and electrons. The cathode catalyst interacts with the cathode gas and the reaction intermediates to catalyze the conversion of the cathode gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Electrons are formed at the anode side of the membrane electrode assembly, indicating that the anode gas undergoes oxidation during the fuel cell reaction. Electrons are consumed at the cathode side of the membrane electrode assembly, indicating that the cathode gas undergoes reduction during the fuel cell reaction.

For example, when hydrogen and oxygen are the gases used in a fuel cell, the hydrogen flows through the anode flow field plate and undergoes oxidation. The oxygen flows through the cathode flow field plate and undergoes reduction. The specific reactions that occur in the fuel cell are represented in equations 1–3.

$$H_2 \rightarrow 2H^+ + 2e^- \quad (1)$$

$$\tfrac{1}{2}O_2 + 2H^+ + 2e^- \rightarrow H_2O \quad (2)$$

$$H_2 + \tfrac{1}{2}O_2 \rightarrow H_2O \quad (3)$$

As shown in equation 1, the hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant (e.g., liquid de-ionized water) at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack may also include monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

SUMMARY

The invention relates to fuel cells.

Under some operating conditions, such as those occurring at high operating levels and/or at relatively high temperatures, the performance of a fuel cell or a fuel cell stack can be reduced, for example, compared to when the fuel cell or fuel cell stack is operating at relatively lower temperatures and/or operating levels. Without wishing to be bound by theory, it is believed that this decreased performance can be caused by degradation of the electrolyte by peroxide. It is believed that peroxide can be produced from the chemical reaction occurring at the cathode, e.g., as an intermediate; and/or peroxide can be produced as a result of protons and oxygen diffusing through the electrolyte. The peroxide is capable of reacting with and degrading the electrolyte. For example, in embodiments in which the electrolyte includes a fluorocarbon polymer, the peroxide can be catalyzed by impurities, e.g., iron, in the electrolyte, and hydrogen fluoride (a product of a degradation reaction) can be detected in a gas stream exiting the fuel cell stack. At relatively high temperatures, the degree of degradation is further enhanced. In some cases, for about every 10° C. increase in operating temperature, the degree of electrolyte degradation can double.

Decreased performance of the fuel cell or the fuel cell stack can also be caused by condensation of water carried by a reactant gas, which can be saturated with water. Condensed water can act a gas diffusion barrier, e.g., by resisting the flow of oxygen gas. As a result, this can lower the performance of the fuel cell by preventing the fuel cell reactions from occurring.

In one aspect, the invention features a fuel cell or a fuel cell stack having good resistance to membrane degradation and/or good handling of condensed water, e.g., good dispersion or low absorption of water. In some embodiments, the fuel cell or the fuel cell stack minimizes peroxide. In certain embodiments, the fuel cell or the fuel cell stack allows condensed water to be effectively removed from the cell or stack. As a result, the performance of the fuel cell or the fuel cell stack can be enhanced, e.g., at high operating levels. In embodiments, the fuel cell or the fuel cell stack includes one or more non-electrolytic layers adjacent to one or more catalyst layers. The non-electrolytic layer can have a relatively compact and economical design.

In another aspect, the invention features a fuel cell including a first gas diffusion layer, a second gas diffusion layer, an electrolyte between the first and the second gas diffusion layers, a first catalyst layer between the electrolyte and the first gas diffusion layer, a first non-electrolytic layer between the first catalyst layer and the first gas diffusion layer, and a second catalyst layer between the electrolyte and the second gas diffusion layer.

Embodiments may include one or more of the following features. The first nonelectrolytic layer includes a non-electrolytic polymer, such as a fluorine-containing resin, e.g., polytetrafluoroethylene. The first non-electrolytic layer includes a copolymer of tetrafluoroethylene and hexafluoropropylene. The first non-electrolytic layer includes electrically conductive particulate material, such as platinum, e.g., unsupported on another material. The first catalyst layer is a cathode or an anode. The electrolyte includes a proton exchange membrane. The first non-electrolytic layer is discrete from the first catalyst layer.

The fuel cell can further include a second non-electrolytic layer between the second catalyst layer and the second gas diffusion layer.

The fuel cell can further include a first flow plate, and a second flow plate, wherein the first gas diffusion layer is between the first non-electrolytic layer and the first flow plate, and the second gas diffusion layer is between the second catalyst layer and the second flow plate.

The first non-electrolytic layer can have a thickness substantially equal to the thickness of the first catalyst layer.

In another aspect, the invention features a fuel cell including a first gas diffusion layer, a second gas diffusion layer, an electrolyte between the first and the second gas diffusion layers, a first catalyst layer between the electrolyte and the first gas diffusion layer, the first catalyst layer comprising a first electrolytic polymer and a first non-electrolytic polymer, and a second catalyst layer between the electrolyte and the second gas diffusion layer.

Embodiments may include one or more of the following features. The first electrolytic polymer includes an ionomer, such as a sulphonated fluorocarbon polymer. The first non-electrolytic polymer includes a fluorine-containing resin, such as polytetrafluoroethylene. The first non-electrolytic polymer includes a copolymer of tetrafluoroethylene and hexafluoropropylene. The first electrolytic polymer and the first non-electrolytic polymer form a mixture.

The second catalyst layer can include a second electrolytic polymer and a second non-electrolytic polymer.

In another aspect, the invention features a method of operating a fuel cell system. The method includes contacting a first gas with a first non-electrolytic layer contained in a first fuel cell, and contacting the first gas with a first catalyst layer contained in the first fuel cell.

Embodiments may include one or more of the following features. The first gas can include a cathode gas, e.g., having oxygen. The first gas can contact the first non-electrolytic layer before the first gas contacts the first catalyst layer. The method further includes contacting a second gas with a second non-electrolytic layer contained in the first fuel cell, and contacting the second gas with a second catalyst layer contained in the first fuel cell. The first non-electrolytic layer includes polytetrafluoroethylene and platinum.

In another aspect, the invention features a fuel cell including an electrolyte, a gas diffusion layer, a plurality of layers between the electrolyte and the gas diffusion layer, at least two of the layers having different concentrations of a non-electrolytic material, and an electrode layer between the electrolyte and the plurality of layers.

Embodiments may include one or more of the following features. The plurality of layers includes a layer adjacent to the gas diffusion layer having the highest concentration of non-electrolytic material relative to other layers of the plurality of layers. The plurality of layers includes a concentration gradient of the non-electrolytic material between the electrolyte and the gas diffusion layer. The concentration gradient is substantially linear. The concentration gradient decreases from the gas diffusion layer to the electrolyte. The non-electrolytic material includes polytetrafluoroethylene.

In another aspect, the invention features a fuel cell having an electrolyte, a gas diffusion layer, and a plurality of layers between the electrolyte and the gas diffusion layer. At least two of the plurality of layers include a non-electrolytic material and an electrolytic material, and at least two of the plurality of layers having different concentrations of the non-electrolytic material.

Embodiments may include one or more of the following features. The plurality of layers includes a layer adjacent to the gas diffusion layer having the highest concentration of the non-electrolytic material relative to the other layers of the plurality of layers. The plurality of layers includes a concentration gradient of the non-electrolytic material between the electrolyte and the gas diffusion layer. The concentration gradient of the non-electrolytic material is substantially linear. The concentration gradient of the non-electrolytic material decreases from the gas diffusion layer to the electrolyte. The plurality of layers includes a layer adjacent to the electrolyte having the highest concentration of electrolytic material relative to other layers of the plurality of layers. The plurality of layers includes a concentration gradient of the electrolytic material between the electrolyte and the gas diffusion layer. The concentration gradient of the electrolytic material is substantially linear. The concentration gradient of the electrolytic material increases from the gas diffusion layer to the electrolyte.

The plurality of layers can include a catalyst. The non-electrolytic material can include polytetrafluoroethylene.

Other features, aspects, and advantages of the invention will be apparent from the drawings, description, and claims.

DETAILED DESCRIPTION OF THE PREFERRED EMBODIMENT

Figure 1:
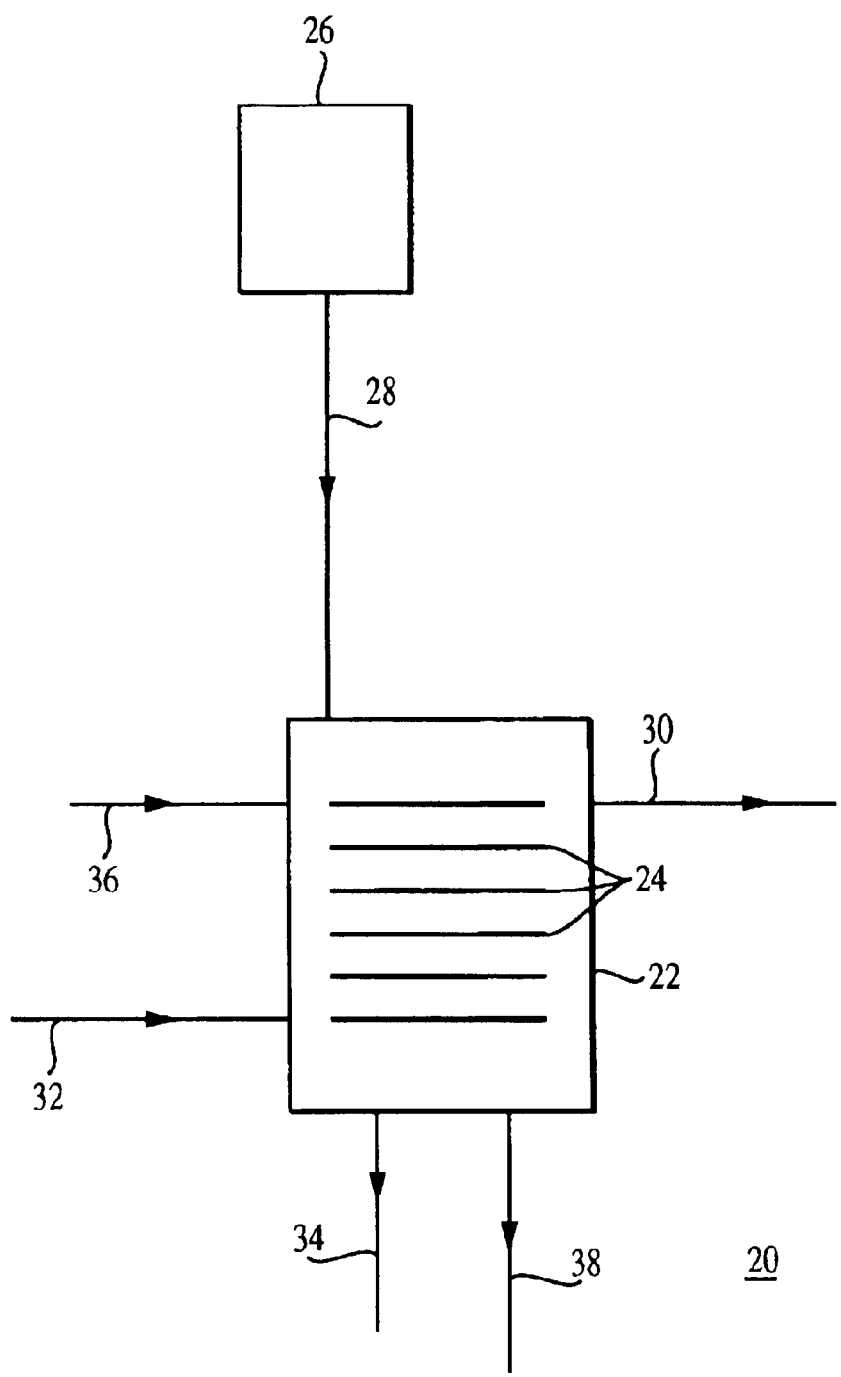
FIG. 1 is a partial schematic diagram of an embodiment of a fuel cell system.

FIG. 1 shows a fuel cell system 20 including a fuel cell stack 22 that has a plurality of fuel cells 24. Fuel cell system 20 also includes an anode gas supply 26, an anode gas inlet line 28, an anode gas outlet line 30, a cathode gas inlet line 32, a cathode gas outlet line 34, a coolant inlet line 36, and a coolant outlet line 38.

Figure 2:
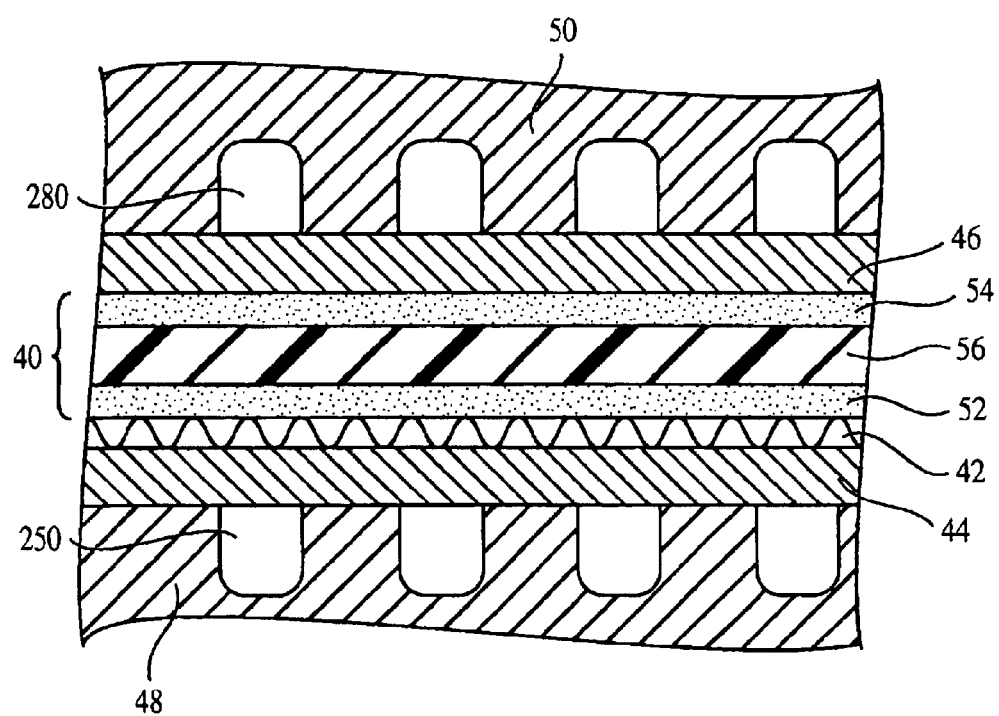
FIG. 2 is a partial schematic diagram of an embodiment of a fuel cell.

FIG. 2 shows an embodiment of fuel cell 24 having a membrane electrode assembly (MEA) 40, a non-electrolytic layer 42, gas diffusion layers (GDLs) 44 and 46, a cathode flow field plate 48, and an anode flow field plate 50. MEA 40 includes a cathode 52, an anode 54, and a solid electrolyte 56 between electrodes 52 and 54. Cathode flow field plate 48 has cathode gas channels 250, and anode flow field plate 50 has anode gas channels 280. Fuel cells 24 can be arranged by having the back surface of a cathode flow field plate of one fuel cell serve as the anode flow field plate in an adjacent fuel cell. A plurality of coolant flow field plates (described below) can also be used in this arrangement.

Non-electrolytic layer 42 is generally configured to reduce, e.g., minimize, the adverse effect of peroxide that can form during operation of fuel cell system 20 and/or to reduce the adverse effect of water that can condense in fuel cells 24. For example, non-electrolytic layer 42 can electrolytically isolate carbon material in GDL 44, e.g., from oxygen, to reduce peroxide generation. In some embodiments, non-electrolytic layer 42 includes a mixture of a catalyst and a non-electrolytic material as a binder.

The catalyst in non-electrolytic layer 42 is typically formed of a particulate material capable of being used in a fuel cell during operating conditions, and capable of reducing a concentration of peroxide. For example, the catalyst can catalyze the reaction of peroxide formed during the cathode reaction, e.g., at the cathode/non-electrolytic layer interface, into water and oxygen, thereby reducing degradation of the electrolyte. In some embodiments, the catalyst is also capable of interacting with protons, electrons, and oxygen to form water. Examples of catalysts include platinum, e.g., platinum black, ruthenium, iridium, rhodium, palladium, molybdenum, and their alloys. Other suitable catalysts having the above characteristics can be used.

In some embodiments, the catalyst is unsupported on another material, i.e., a support material. Under some operating conditions, a support material, such as carbon, can be modified, e.g., oxidized at low current densities, which can cause the catalyst particles to agglomerate. As a result, the effectiveness of the catalyst, e.g., catalyst utilization, can be reduced. For enhanced catalytic activity, the unsupported catalyst particles can have relatively large surface area, such as between about 60 $m^2/g$ and 120 $m^2/g$, e.g., greater than 60, 70, 80, 90, 100, or 110 $m^2/g$, and/or less than 120, 110, 100, 90, 80, or 70 $m^2/g$. The catalyst particles be relatively small, such as less than about 45 angstroms, e.g., <40, <35, <30, <25, <20, <15, or <10 angstroms.

Alternatively or in addition, the catalyst can be supported on another material, such a material resistant to oxidation and/or reduction. Distributing the catalyst on a support material allows the catalytic activity of non-electrolytic layer 42 to be maintained at the same level as using bulk, unsupported catalyst, while the total amount of catalyst in the non-electrolytic layer can be reduced, thereby reducing the cost of forming the non-electrolytic layer. That is, while less catalyst may be used to form non-electrolytic layer 42, a greater fraction of the catalyst is effectively used for the fuel cell reaction, as compared to using bulk, unsupported catalyst. Examples of support materials include tungsten oxide, zirconium oxide, niobium oxide, tantalum oxide, and carbon. The catalyst can be loaded on a support material between about 0.5 $mg/cm^2$ to about 2.0 $mg/cm^2$, e.g., greater than 0.5, 0.75, 1.0, 1.25, 1.5, or 1.75 $mg/cm^2$, and/or less than 2.0, 1.75, 1.5, 1.25, 1.0, or 0.75 $mg/cm^2$, of the support material.

The catalyst, unsupported or supported on another material, is formed into a mechanically-bonded mixture with the non-electrolytic material as a binder. The binder can minimize the adverse effect of condensed water on fuel cell system 20. The binder can be a non-ionomeric material. The binder can be a material that has relatively low water absorbency. In certain embodiments, the binder has water absorbency lower than that of an ionomer commercially available as NAFION (duPont). In some embodiments, the binder is a hydrophobic material that repels and/or disperses condensed water. As a result, condensed water can be easily removed from the fuel cell or fuel cell stack by fuel cell gases, thereby minimizing the effect of water as a barrier against the reactant gases and maximizing the fuel cell reactions. Examples of non-electrolytic materials include fluorine-containing compounds such as polytetrafluoroethylene (PTFE), and copolymers of tetrafluoroethylene and hexafluoropropylene.

Furthermore, since it is non-electrolytic, the binder can prevent protons from conducting through non-electrolytic layer 42. Thus, protons formed at anode 54 that migrate through electrolyte 56 and cathode 52 are generally isolated from GDL 44. As a result, GDL 44 can be protected from degradation, such as from oxidizing or reducing conditions in fuel cell 24.

Non-electrolytic layer 42 generally includes an amount of binder that is sufficient to hold the layer together physically but which does not adversely decrease the electrical conductivity of the non-electrolytic layer. For example, non-electrolytic layer 42 can be sufficiently electrically conductive such that electrons produced at anode 54 can flow through GDL 44 and the non-electrolytic layer, and to cathode 52, where the electrons can react with protons and oxygen according to the cathode reaction. For example, non-electrolytic layer 42 can include less than about 30%, e.g., greater 0, 5, 10, 15, 20, or 25%, and/or less than 30, 25, 20, 15, 10, or 5%, of the non-electrolytic binder, with the remainder of the layer being the catalyst.

The thickness of non-electrolytic layer 42 can vary. For example, non-electrolytic layer 42 can be as thick as cathode 52 or anode 54, or thicker than either electrode.

Non-electrolytic layer 42 can be formed by applying a suspension (e.g., platinum black and PTFE) to a decal, and drying the decal at an elevated temperature. After the decal has dried, it is hot pressed on to catalyst layer 52 to transfer the non-electrolytic layer to the catalyst layer. Alternatively, a suspension is applied to the surface of a gas diffusion layer (described below) that faces solid electrolyte 56, and the suspension is then dried. The method of preparing non-electrolytic layer 42 may further include the use of pressure and temperature to achieve bonding.

Electrolyte 56 should be capable of allowing ions to flow therethrough while providing a substantial resistance to the flow of electrons. In some embodiments, electrolyte 56 is a solid polymer (e.g., a solid polymer ion exchange membrane), such as a solid polymer proton exchange membrane (e.g., a solid polymer containing sulfonic acid groups). Such membranes are commercially available from E. I. DuPont de Nemours Company (Wilmington, Del.) under the trademark NAFION. Alternatively, electrolyte 56 can also be prepared from the commercial product GORE-SELECT, available from W. L. Gore & Associates (Elkton, Md.).

Anode 54 can be formed of a material capable of interacting with hydrogen to form protons and electrons. Examples of such materials include, for example, platinum, platinum alloys, such as platinum-ruthenium, and platinum dispersed on carbon black. Anode 54 can further include an electrolyte, such as an ionomeric material, e.g., NAFION, that allows the anode to conduct protons. Alternatively, a suspension is applied to the surfaces of gas diffusion layers (described below) that face solid electrolyte 56, and the suspension is then dried. During the preparation of MEA 40, catalyst material (e.g., platinum) can be applied to electrolyte 56 using standard techniques. The method of preparing anode 54 may further include the use of pressure and temperature to achieve bonding.

Cathode 52 can be formed of a material capable of interacting with oxygen, electrons and protons to form water. Examples of such materials include, for example, platinum, platinum alloys, and noble metals dispersed on carbon black. Cathode 52 can further include an electrolyte, such as an ionomeric material, e.g., NAFION, that allows the cathode to conduct protons. Cathode 52 can be prepared as described above with respect to anode 54.

Gas diffusion layers 44 and 46 are electrically conductive so that electrons can flow from anode 54 to flow field plate 50 and from flow field plate 48 to cathode 52. GDLs can be formed of a material that is both gas and liquid permeable. It may also be desirable to provide the GDLs with a planarizing layer, for example, by infusing a porous carbon cloth or paper with a slurry of carbon black followed by sintering with a polytetrafluoroethylene material. Suitable GDLs are available from various companies such as Etek in Natick, Mass., and Zoltek in St. Louis, Mo.

Figure 3:
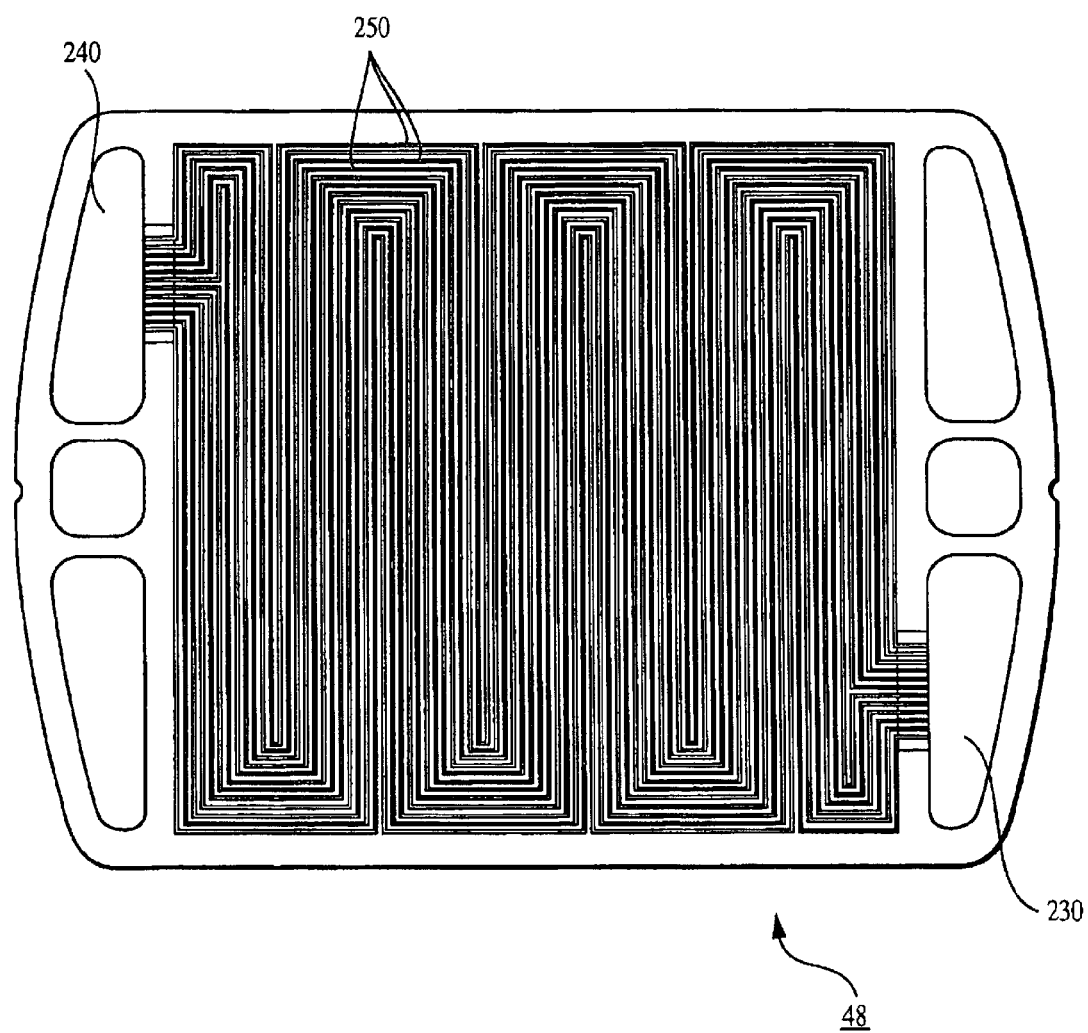
FIG. 3 shows an embodiment of a cathode flow field plate.

FIG. 3 shows a cathode flow field plate 48 having an inlet 230, an outlet 240, and open-faced channels 250 that define a flow path for a cathode gas from inlet 230 to outlet 240. A cathode gas flows from cathode gas inlet line 32 and enters flow field plate 48 via inlet 230 to cathode outlet line 54. The cathode gas then flows along channels 250 and exits flow field plate 48 via outlet 240. As the cathode gas flows along channels 250, oxygen contained in the cathode gas can permeate gas diffusion layer 44 (and layer 42) and interact with cathode 52. Electrons and protons present at cathode 52 react with the oxygen to form water. The water can pass back through diffusion layer 44, enter the cathode gas stream in channels 250, and exit plate 48 through cathode flow field plate outlet 240.

Figure 4:
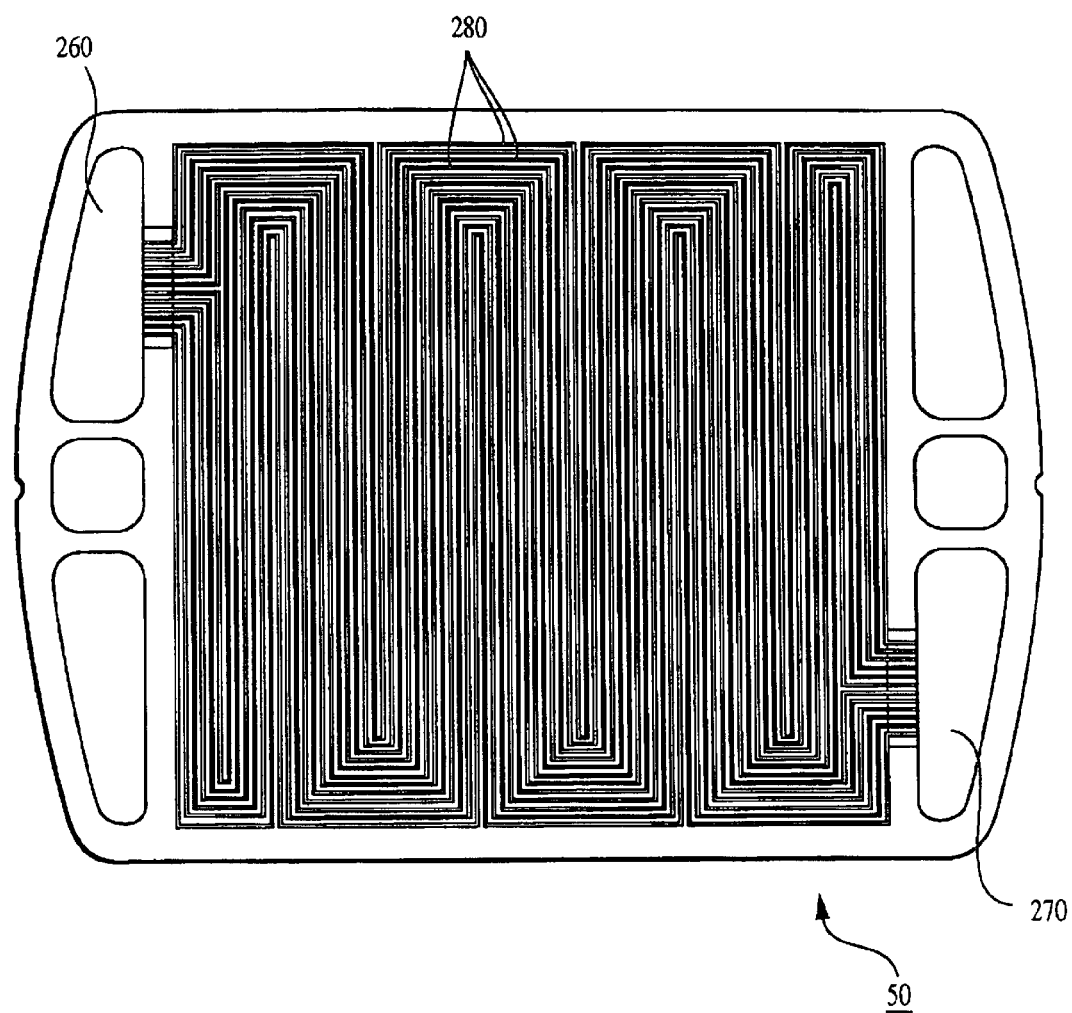
FIG. 4 shows an embodiment of an anode flow field plate.

FIG. 4 shows an anode flow field plate 50 having an inlet 260, an outlet 270, and open-faced channels 280 that define a flow path for an anode gas from inlet 260 to outlet 270. An anode gas flows from the anode gas inlet line 28 and enters flow field plate 50 via inlet 260. The anode gas then flows along channels 280 and exits flow field plate 50 via outlet 270 to anode outlet line 30. As the anode gas flows along channels 280, hydrogen contained in the anode gas can permeate gas diffusion layer 46 and interact with anode 54 to form protons and electrons. The protons pass through solid electrolyte 56, and the electrons are conducted through gas diffusion layer 46 to anode flow field plate 50, ultimately flowing through an external load to cathode flow field plate 48.

Figure 5:
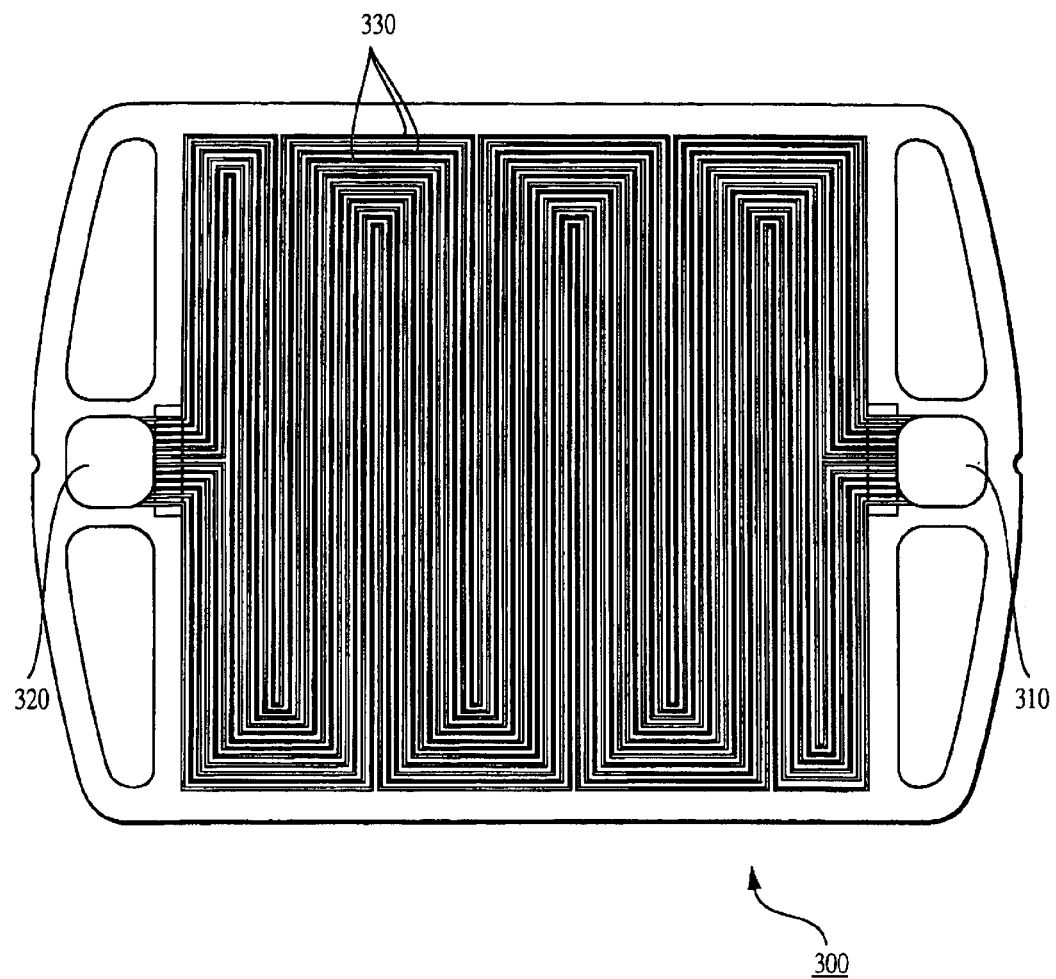
FIG. 5 shows an embodiment of a coolant flow field plate.

Heat produced during the fuel cell reaction is removed from fuel cell 24 by flowing a coolant through the fuel cell via a coolant flow field plate. FIG. 5 shows a coolant flow field plate 300 having an inlet 310, an outlet 320 and open-faced channels 330 that define a flow path for coolant from inlet 310 to outlet 320. The coolant enters fuel cell 24 from coolant inlet line 36 via inlet 310, flows along channels 330 and absorbs heat, and exits fuel cell 24 via outlet 320 to coolant outlet line 38.

Fuel cells 24 are arranged within fuel cell stack 22 such that inlets 260 are configured to be in fluid communication with anode gas inlet line 28, and outlets 270 are configured to be in fluid communication with anode gas outlet line 30. Similarly, inlets 230 are configured to be in fluid communication with cathode gas inlet line 32, and outlets 240 are configured to be in fluid communication with cathode gas outlet line 34. Likewise, inlets 310 are configured to be in fluid communication with coolant inlet line 36, and outlets 320 are configured to be in fluid communication with cathode gas outlet line 38.

Methods of making membrane electrode assemblies and membrane electrode units are described, for example, in U.S. Pat. No. 5,211,984, which is hereby incorporated by reference.

Other Embodiments

Figure 6:
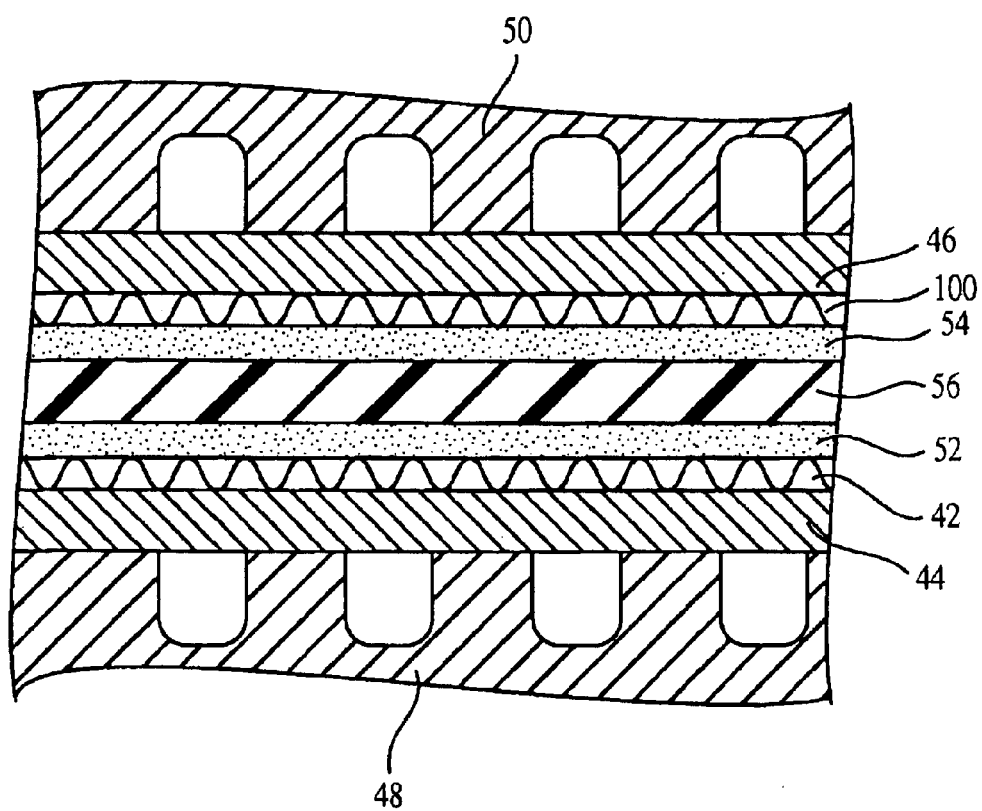
FIG. 6 is a partial schematic diagram of an embodiment of a fuel cell.

In some embodiments, fuel cell 24 further includes a second non-electrolytic layer 100 between anode 54 and GDL 46 (FIG. 6). Non-electrolytic layer 100 can be generally the same as non-electrolytic layer 42. In some embodiments, fuel cell 24 includes a non-electrolytic layer between anode 54 and GDL 46 only, i.e., the fuel cell does not include a non-electrolytic layer between cathode 52 and GDL 44.

Figure 7:
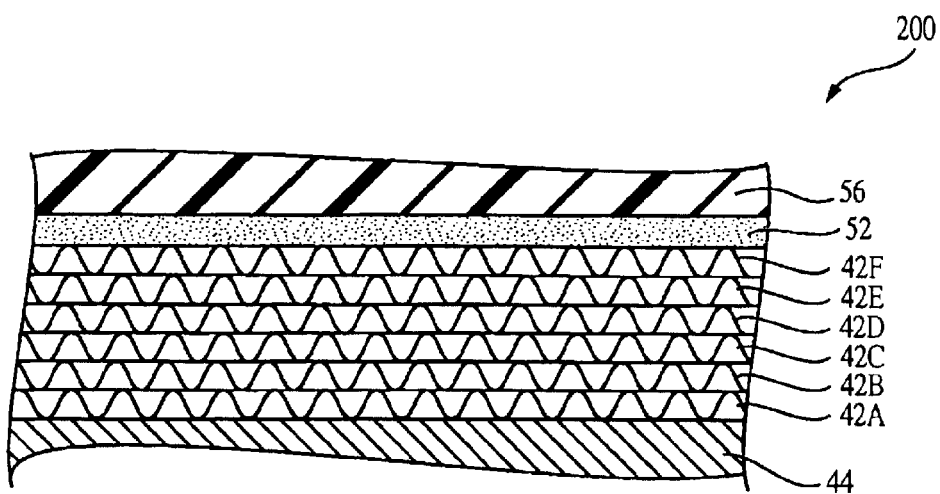
FIG. 7 is a partial schematic diagram of an embodiment of a fuel cell.

In other embodiments, multiple non-electrolytic layers 42 can be used, e.g., to provide an assembly or stack having a concentration gradient of the non-electrolytic material and/or the catalyst. Referring to FIG. 7, a fuel cell 200, similar to fuel cell 24, includes multiple (here, six) non-electrolytic layers 42A, 42B, 42C, 42D, 42E, and 42F. Layers 42A, 42B, 42C, 42D, 42E, and 42F are generally formed as described above for layer 42, but layers 42A, 42B, 42C, 42D, 42E, and 42F have different concentrations of non-electrolytic material and/or catalyst, relative to each other. In some embodiments, layers 42A, 42B, 42C, 42D, 42E, and 42F have concentrations of non-electrolytic material and/or catalyst that decrease, from highest near GDL 44 to lowest near cathode 52. For example, layer 42A (which is adjacent to GDL 44) has the highest concentration of non-electrolytic material and/or catalyst (relative to layers 42B–42F), layer 42F (which is adjacent to cathode 52) has the lowest concentration of non-electrolytic material and/or catalyst (relative to layers 42A–42E), and layers 42B, 42C, 42D, and 42E have intermediate concentrations of non-electrolytic material and/or catalyst to form a concentration gradient of non-electrolytic material and/or catalyst across layers 42A, 42B, 42C, 42D, 42E, and 42F. In some embodiments, the non-electrolytic layer having the lowest concentration of non-electrolytic material and/or catalyst may have a zero concentration of non-electrolytic material and/or catalyst. For example, layer 42A may have up to 30% of the non-electrolytic material, and layer 42F may have 0% of the non-electrolytic material.

The concentration gradient can be substantially linear or non-linear, e.g., lock step, or having concentration gradients and plateaus. For example, for a fuel cell having a linear concentration gradient across a plurality of substantially similar non-electrolytic layers, (e.g., six layers, 42A–42G), the layers can have a concentration of non-electrolytic material such as 30%, 25%, 20%, 15%, 10%, 5%, and 0%, from the electrolyte to the GDL, or from the GDL to the electrolyte. Fuel cell 200 can include, for example, more than 5, 10, 15, 20, 25, 30, 35, 40, 45, or 50 non-electrolytic layers. Increasing the number non-electrolytic layers can enhance the uniformity and/or linearity of the concentration gradient.

In other embodiments, layers 42A, 42B, 42C, 42D, 42E, and 42F have concentrations of non-electrolytic material and/or catalyst that increase, from lowest near GDL 44 to highest near electrolyte 56. Alternatively or in addition, multiple non-electrolytic layers 42 can also be used between anode 54 and GDL 46 to provide a concentration gradient of non-electrolytic material and/or the catalyst, as described above. The multiple non-electrolytic layers can have similar or different dimensions, e.g., thickness.

While in some of the above embodiments non-electrolytic layer 42 is described as a layer discrete from cathode 52 or anode 54, in other embodiments, components of the non-electrolytic layer and the electrodes 52 or 54 can be combined into one layer. For example, a fuel cell can include an electrode layer (e.g., between electrolyte 56 and GDL 44) having an intimate mixture of one or more catalysts (e.g., Pt-Ru and/or Pt black), an electrolytic material (e.g., NAFION), and a non-electrolytic material (e.g., PTFE). This electrode layer can be used on either side or both sides of the solid electrolyte. The electrode configuration, e.g., thickness or composition, can be optimized to enhance fuel cell performance. The catalyst(s), electrolytic material, and non-electrolytic material can be generally the same as described above.

Figure 8:
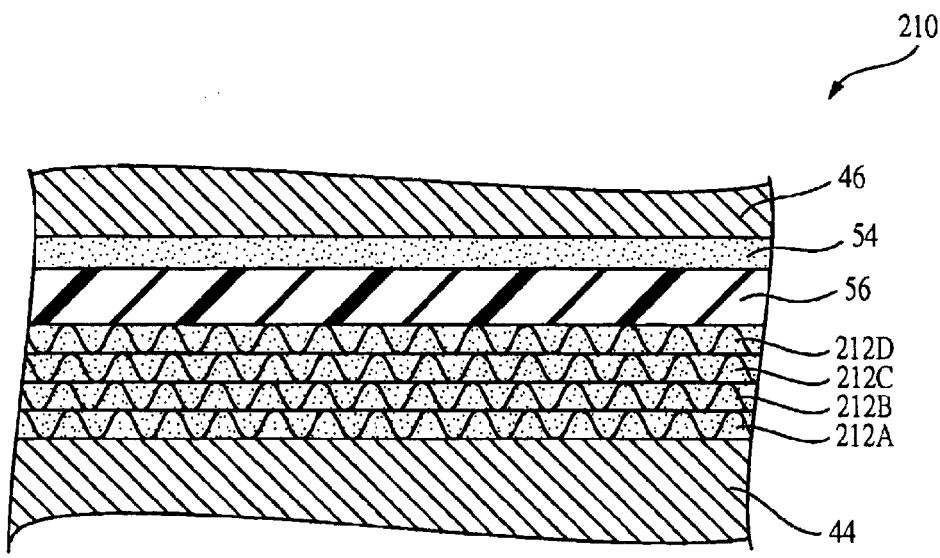
FIG. 8 is a partial schematic diagram of an embodiment of a fuel cell.

In certain embodiments, a fuel cell may include multiple layers that include components of non-electrolytic layer 42 combined with components of electrodes 52 or 54. That is, non-electrolytic layer 42 and electrodes 52 or 54 are not discrete layers. Referring to FIG. 8, a fuel cell 210 includes multiple (here, four) layers 212A, 212B, 212C, and 212D between GDL 44 and electrolyte 56. Layers 212A, 212B, 212C, and 212D include an intimate mixture of one or more catalysts (e.g., Pt-Ru and/or Pt black), an electrolytic material (e.g., NAFION), and a non-electrolytic material (e.g., PTFE). Layers 212A, 212B, 212C, and 212D have different concentrations of the electrolytic material, the non-electrolytic material, and/or the catalyst, relative to each other. In some embodiments, layers 212A, 212B, 212C, and 212D have concentrations of non-electrolytic material, electrolytic material, and/or catalyst that decrease, from highest near GDL 44 to lowest near electrolyte 56, as similarly described above for layers 42A–42F. In other embodiments, layers 212A, 212B, 212C, and 212D have concentrations of non-electrolytic material, electrolytic material, and/or catalyst that increase, from lowest near GDL 44 to highest near electrolyte 56, as described above.

For example, layer 212D can have the highest concentration of electrolytic material (e.g., NAFION), and layer 212A can have the lowest concentration, e.g., zero concentration, of the electrolytic material. Alternatively or in addition, layer 212D can have the lowest concentration (e.g., zero concentration) of non-electrolytic material (e.g. PTFE), and layer 212A can have the highest concentration of the non-electrolytic material. The concentration gradients for the electrolytic material and the non-electrolytic material can be both linear, both non-linear, or a combination of linear or non-linear, e.g., the concentration gradient for the electrolytic material can be linear and the concentration gradient for the non-electrolytic material can be non-linear.

The concentration gradient can be substantially linear, e.g. constant, or non-linear, e.g., lock step, or having concentration gradients and plateaus. Fuel cell 210 can include, for example, more than 5, 10, 15, 20, 25, 30, 35, 40, 45, or 50 of layers 212, such as layers 212A, 212B, 212C, and 212D. Alternatively or in addition, multiple layers 212, such as layers 212A, 212B, 212C, and 212D, can be used on the anode side of fuel cell 210. Fuel cell 210 can have a concentration gradient with respect to the electrolytic material, the non-electrolytic material, and/or the catalyst.

Other embodiments are in the claims.

What is claimed is:

1. A fuel cell, comprising:
   a first gas diffusion layer;
   a second gas diffusion layer;
   an electrolyte between the first and the second gas diffusion layers;
   a first catalyst layer between the electrolyte and the first gas diffusion layer;
   a first non-electrolytic layer between the first catalyst layer and the first gas diffusion layer, the first non-electrolytic layer comprising a catalyst; and a second catalyst layer between the electrolyte and the second gas diffusion layer.

2. The fuel cell of claim 1, wherein the first non-electrolytic layer comprises a non-electrolytic polymer.

3. The fuel cell of claim 1, wherein the first non-electrolytic layer comprises a fluorine-containing resin.

4. The fuel cell of claim 1, wherein the first non-electrolytic layer comprises polytetrafluoroethylene.

5. The fuel cell of claim 1, wherein the first non-electrolytic layer comprises a copolymer of tetrafluoroethylene and hexafluoropropylene.

6. The fuel cell of claim 1, wherein the catalyst comprises electrically conductive particulate material.

7. The fuel cell of claim 6, wherein the particulate material is unsupported on another material.

8. The fuel cell of claim 6, wherein the particulate material comprises platinum.

9. The fuel cell of claim 1, wherein the first catalyst layer is a cathode.

10. The fuel cell of claim 1, wherein the first catalyst layer is an anode.

11. The fuel cell of claim 1, wherein the electrolyte comprises a proton exchange membrane.

12. The fuel cell of claim 1, further comprising a second non-electrolytic layer between the second catalyst layer and the second gas diffusion layer.

13. The fuel cell of claim 1, further comprising a first flow plate; and a second flow plate, wherein the first gas diffusion layer is between the first non-electrolytic layer and the first flow plate, and the second gas diffusion layer is between the second catalyst layer and the second flow plate.

14. The fuel cell of claim 1, wherein the first non-electrolytic layer has a thickness substantially equal to the thickness of the first catalyst layer.

15. The fuel cell of claim 1, wherein the first non-electrolytic layer is discrete from the first catalyst layer.

16. The fuel cell of claim 1, wherein the catalyst is capable is capable of reducing peroxide.

17. The fuel cell of claim 1, wherein the catalyst comprises a material selected from the group consisting of platinum, ruthenium, iridium, rhodium, palladium, and molybdenum.

18. The fuel cell of claim 1, wherein the catalyst is supported on a second material.

19. The fuel cell of claim 18, wherein the second material comprises a material selected from the group consisting of tungsten oxide, zirconium oxide, niobium oxide, tantalum oxide, and carbon.

20. The fuel cell of claim 18, wherein the catalyst is loaded on the second material from about 0.5 mg/cm$^2$ to about 2.0 mg/cm$^2$.

21. The fuel cell of claim 1, wherein the catalyst has a surface area of from about 60 m$^2$/g to about 120 m$^2$/g.

22. The fuel cell of claim 1, wherein the catalyst has a particle size of less than about 45 angstroms.

* * * * *